United States Patent Office 3,552,757
Patented Jan. 5, 1971

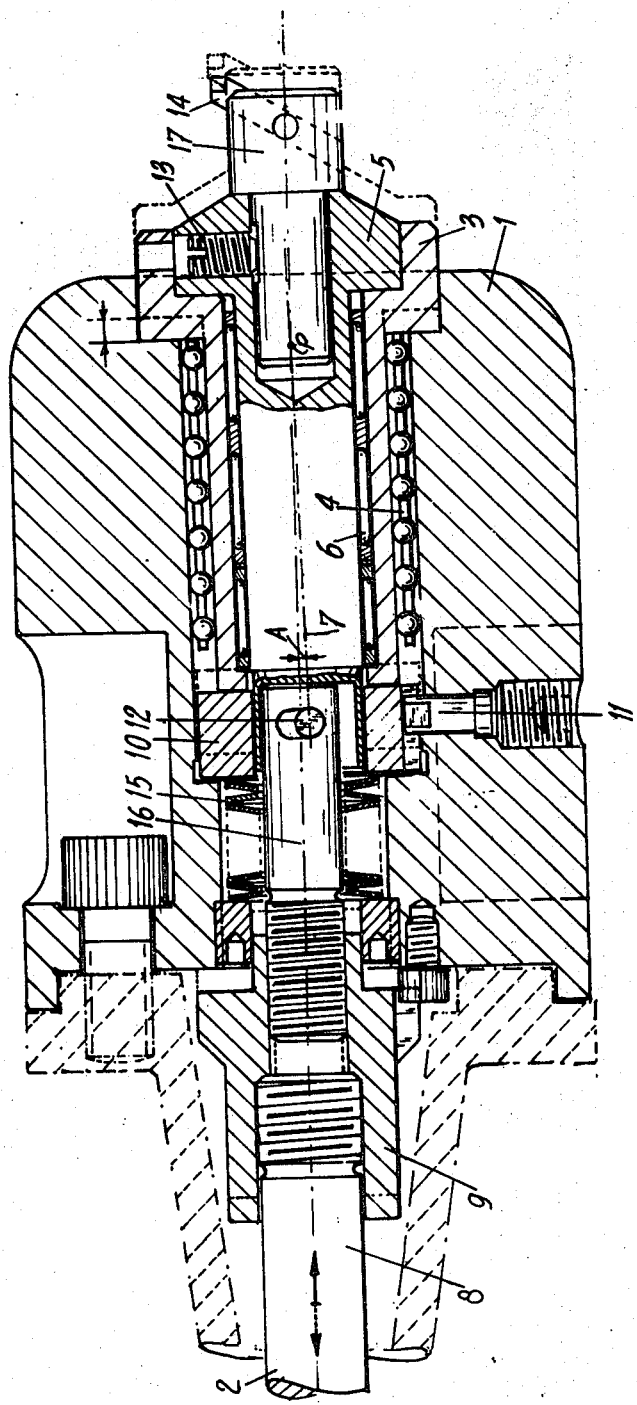

3,552,757
HOLDER FOR TOOL OR WORKPIECE
Martinus J. Salters, Zaandam, Netherlands, assignor to Staatsbedrijf Artillerie-Inrichtingen, Hembrug-Zaandam, Netherlands, a state-owned company of the Netherlands
Filed Aug. 19, 1968, Ser. No. 753,517
Claims priority, application Netherlands, Aug. 29, 1967, 6711832
Int. Cl. B23b 31/36
U.S. Cl. 279—6
4 Claims

ABSTRACT OF THE DISCLOSURE

A holder for tool or workpiece. The holder comprises a casing and a sliding bush which is disposed with provision for displacement in a channel or bore and in which a carrier is disposed eccentrically for receiving the tool or workpiece. To perform both preliminary working and after-working with one tool such that only one tool must be accurately adjusted, the axis of the channel for the sliding bush enclosed in acute angle with the axis of the casing.

---

The invention relates to a holder for a tool or workpiece, comprising a casing and a sliding bush which is disposed with provision for displacement in a channel or bore and in which a carrier is disposed eccentrically for receiving the tool or workpiece.

The eccentric disposition of the carrier receiving the tool or workpiece in the sliding bush enables the tool to be very accurately adjusted in relation to the workpiece. This is done by making the amount of eccentricity very small. By rotating the sliding bush in the casing, the tip of, for instance, the chisel, is displaced radially in relation to the workpiece, thus producing the required accurate adjustment.

With the prior art holders, the preliminary working and after-working of a workpiece are as a rule performed by two tools placed one behind the other on one carrier. The result is a relatively long carrier, with a large extended length. Moreover, radial adjustment is still required, which calls for laborious maneuvering.

It is an object of the invention to perform both preliminary working and after-working with one tool, and the carrier is kept short. This feature has the advantage that only one tool must be accurately adjusted.

To this end, the axis of the channel for the sliding bush encloses an acute angle with the axis of the casing. The axial displacement of the sliding bush with the carrier received therein also displaces the tool and the workpiece in the radial direction. Both preliminary working and after-working can therefore be performed with a workpiece or tool accurately adjusted once.

Other features of the invention will be gathered from the following description, with reference to the drawing, which is a section through a holder according to the invention.

The casing 1 of the holder has a channel or bore whose axis 7 encloses according to the invention an acute angle A with the axis 2 of the casing. The point "P" is the point of intersection of the axes 2 and 7. A sliding bush 3 is mounted in the channel with provision for rotation and axial displacement by means of a ball bush 4. The sliding bush has a somewhat eccentric bore in which a carrier 5 is mounted via needle bearings 6. The rotation of the sliding bush 3, the front side of which has a graduated scale, radially displaces the carrier 5 mounted eccentrically in the sliding bush 3 so that, as a result of the small amount of eccentricity, a tool borne by the carrier, for instance a chisel 14, can be radially adjusted with great accuracy.

As well as being radially displaceable by the rotation of the sliding bush 3, the chisel 14 can also be radially displaced by an axial displacement of the sliding bush 3. As a result of the acute angle A between the axes 2 and 7, an axial displacement of the sliding bush 3 in the channel of the casing 1 along the axis 7 also results in a radial displacement of the sliding bush 3, the carrier 5 and the chisel 14, in relation to the axis 2 of the casing 1.

The fixed amount of this avial displacement (±4 mm.) enables the chisel 14 to occupy two positions, which are shown in the drawing. The rearmost position of the sliding bush 3, shown in solid lines, brings the chisel into the position for preliminary working. The front position of the sliding bush 3 (shown in chain lines) relates to the chisel position for after-working.

The axial displacement of the sliding bush 3 can be effected by a pull rod 8, which can be, for instance, the piston rod of a hydraulic or pnehmatic cylinder. The connecting shaft 16 is connected via a wire coupling bush 9 to the pull rod 8 and is disposed with provision for displacement in a ring 10 retained against rotation in the casing 1 by a pin 11. The connecting shaft 16 and the carrier 5 are coupled by means of a cylindrical pin 12. The aperture in the connecting shaft 16, in which the cylindrical pin 12 is disposed, must be ellipsoidal, to make the pin coupling possible in every radial position of the sliding bush 3 and the carrier 5. Chisel holder 17 is secured in the carrier 5 by means of a screw 13.

To prevent the sliding bush 3 and carrier 5 from rotating undesirably during working, these members are prestressed as required by cup springs 15.

A holder of the kind specified makes both preliminary working and after-working possible, once the chisel has been accurately adjusted, i.e., with the sliding bush in the rearmost position and the chisel tip inside for preliminary working, and with the sliding bush in the front position and the chsel tip outside for after-working.

I claim:
1. A holder for a tool or workpiece, comprising a casing having an axis, said casing having a bore formed therein, said bore having an axis defining an acute angle with respect to the axis of the casing, a bush disposed within said bore and being mounted for axial movement within said bore, a carrier for receiving a tool or workpiece, said carrier being supported by said bush and being eccentrically disposed with respect thereto so as to provide radial adjustment of a tool or workpiece connected to said carrier upon rotation of the bush within said bore and also upon axial movement of the bush within said bore.
2. A holder as defined in claim 1, including a pull rod, said carrier being interconnected with said pull rod by a connecting rod and a coupling means.
3. A holder as defined in claim 2, wherein said connecting shaft is connected with said carrier by a pin, said pin being interconnected with said carrier and disposed within an aperture in said connecting shaft, said aperture being of ellipsoidal configuration.
4. A holder as defined in claim 1, wherein said carrier is supported within said bush by needle bearing means.

References Cited
UNITED STATES PATENTS 2,459,416   1/1949   Davis _____ 279—6X
2,558,815   7/1951   Briney _____ 279—6

THERON F. CONDON, Primary Examiner
D. D. EVENSON, Assistant Examiner

U.S. Cl. X.R.
77—58